US012055172B2

(12) United States Patent
Wang

(10) Patent No.: US 12,055,172 B2
(45) Date of Patent: Aug. 6, 2024

(54) ADAPTABILITY STRENGTH CLIP

(71) Applicant: Xiamen Lemay Trading Co., Ltd., Xiamen (CN)

(72) Inventor: Zhou Wang, Xiamen (CN)

(73) Assignee: Xiamen Lemay Trading Co., Ltd., Xiamen (CN)

( * ) Notice: Subject to any disclaimer, the term of this patent is extended or adjusted under 35 U.S.C. 154(b) by 35 days.

(21) Appl. No.: 17/964,067

(22) Filed: Oct. 12, 2022

(65) Prior Publication Data

US 2023/0031922 A1 Feb. 2, 2023

(51) Int. Cl.
*F16B 2/12* (2006.01)
*F16B 2/00* (2006.01)
*F16B 2/02* (2006.01)
*F16M 13/02* (2006.01)

(52) U.S. Cl.
CPC .................. *F16B 2/12* (2013.01); *F16B 2/00* (2013.01); *F16B 2/02* (2013.01); *F16M 13/022* (2013.01)

(58) Field of Classification Search
CPC ...... F16B 2/12; F16B 2/10; F16B 2/00; F16B 2/02; F16B 2/20; F16M 13/022

USPC ......................................................... 248/316
See application file for complete search history.

(56) References Cited

U.S. PATENT DOCUMENTS

| 4,733,842 | A  | * | 3/1988  | Wilkerson ................ F16B 2/10 24/514 |
| 10,624,471 | B2 | * | 4/2020  | Galant ................... F16M 13/00 |
| 10,750,885 | B2 | * | 8/2020  | Hyma .................... F16B 33/002 |
| 2018/0119719 | A1 |   | 5/2018  | Sawada |
| 2018/0304782 | A1 |   | 10/2018 | Yoshino et al. |
| 2019/0195262 | A1 |   | 6/2019  | Iwahara et al. |

* cited by examiner

*Primary Examiner* — Nkeisha Smith
(74) *Attorney, Agent, or Firm* — Zhigang Ma

(57) ABSTRACT

The present invention relates to the technical field of clips, and specifically relates to an adaptability strength clip comprising a clip seat, a clamping plate and a restraining apparatus. The clamping plate is slidably connected with an inner wall of the clip seat. A regulator is rotatably connected on a surface of the clip seat. A fixator is fixedly connected on the surface of the clip seat. The inner wall of the fixator is rotatably connected with a positioning clip. The restraining device is arranged on the surface of the clip seat. The restraining device comprises a positioning block. The positioning block is fixedly connected on the surface of the clip seat. The positioning holes are formed in the surface of the positioning block. The inner wall of the positioning hole is rotatably connected with a support frame.

7 Claims, 5 Drawing Sheets

ADAPTABILITY STRENGTH CLIP

TECHNICAL FIELD

The present invention relates to the technical field of clips, and in particular to an adaptability strength clip.

BACKGROUND

A clip is a kind of daily life supplies and is widely used. According to the classification of uses, the clip can be divided into a hairpin, a clothespin, etc., and the objects are clamped usually through two sides of a splint.

At present, the regulators of most devices on the market are easily adjusted. In the process of using the devices, after the regulators are adjusted, the devices will be loose, so that the devices cannot be fastened on the table and other objects. As a result, the devices lose the fixed effect, thus reducing the stability of the devices and reducing the fixed performance of the devices. In view of this, the clip needs to be improved.

SUMMARY

The purpose of the present invention is to propose a wooden tray convenient for storage in order to solve the defects in the prior art.

To achieve the above purposes, the present invention adopts the following technical solution: an adaptability strength clip comprises a clip seat, a clamping plate and a restraining apparatus. The clamping plate is slidably connected with an inner wall of the clip seat. A regulator is rotatably connected on a surface of the clip seat. A fixator is fixedly connected on the surface of the clip seat. The inner wall of the fixator is rotatably connected with a positioning clip. The restraining device is arranged on the surface of the clip seat. The restraining device comprises a positioning block. The positioning block is fixedly connected on the surface of the clip seat. The positioning holes are formed in the surface of the positioning block. The inner wall of the positioning hole is rotatably connected with a support frame. The sliding slot is formed in the surface of the support frame; and the inner wall of the sliding slot is inserted into and slidably connected with a limiting bolt.

Preferably, the inner wall of the support frame is fixedly connected with a reset spring. One side of the reset spring away from the support frame is fixedly connected with a binding block. A round hole is formed in the surface of the support frame. The inner wall of the round hole is inserted into and slidably connected with an inserting post. A knob is fixedly connected on the surface of the inserting post. The support frame is arranged, and a position of the apparatus can be adjusted through the support frame, thus preventing the apparatus from interfering with the use of devices.

Preferably, a mounting hole is formed in the surface of the support frame. The binding block is slidably connected with the mounting hole. A positioning slot is formed in the surface of the limiting bolt. The binding block is inserted into and connected with the positioning slot. The binding block is arranged, and a position of the limiting bolt can be restrained through the binding block, so that the position of the limiting bolt cannot be moved, thus realizing the effect of fixing the inserting post.

Preferably, a limiting slot is formed in the surface of the inserting post. The limiting bolt is inserted into and connected with the limiting slot. An inserting slot is formed in the surface of the regulator. The inserting post is inserted into and connected with the inserting slot. The inserting post is arranged, and a controller can be fixed by the inserting post, so that the stability of the controller is increased.

Preferably, a positioning device is arranged on the surface of the fixator. The positioning device comprises a guiding rail. The guiding rail is fixedly connected on a surface of a positioner. The inner wall of the guiding rail is inserted into and slidably connected with a stabilizing block. A mounting slot is formed in the surface of the stabilizing block. The inner wall of the mounting slot is fixedly connected with a limiting spring. A guiding rail is arranged, and moving tracks of the stabilizing block can be guided by the guiding rail, so that the stabilizing block can be accurately inserted into an anchoring block.

Preferably, the inner wall of the mounting slot is inserted into and slidably connected with a pinch plate. A pressing block is fixedly connected on a surface of the pinch plate. The anchoring block is fixedly connected on the surface of the clip seat. The pinch plate is arranged, and the position of the stabilizing block can be fixed by matching the pinch plate with the limiting spring, thereby avoiding movement of the stabilizing block during use.

Preferably, one side of the limiting spring away from the stabilizing block is fixedly connected with the pinch plate. A clamping slot is formed in the inner wall of the guiding rail. The pinch plate is inserted into and connected with the clamping slot. A square slot is formed in the surface of the anchoring block. The stabilizing block is inserted into and connected with the square slot. The limiting spring is arranged. The position of the stabilizing block can be restrained through the limiting spring, and at the same time, after the displacement of the stabilizing block, the limiting spring can be pushed to reset. Compared with the prior art, the present invention has the following advantages and positive effects:

In the present invention, when the devices are used, the devices are clipped onto a table or a handle, and the regulator is rotated immediately. The regulator drives the clamping plate to move as it rotates. The clamping plate is tightened during displacement. Then, the devices are fixed to a surface of an item. At the same time, the devices can be expanded through the positioning clip to facilitate increasing the functions of the devices. By arranging the restraining device, when the devices need to be adjusted, the binding block is pressed. The binding block exerts the pressure on the reset spring due to the force, and then the reset spring is deformed due to the force. At the same time, the binding block loses the restraint, is displaced and disengages from the limiting bolt, and then the limiting bolt is pushed. The limiting bolt disengages from the inserting post due to the force, and then the knob is pulled. The knob drives the inserting post to move due to the force. The inserting post disengages from the regulator during the displacement, and then the support frame is rotated. In the process of rotation, the support frame drives the inserting post to rotate, and then the device can be adjusted using the regulator. By arranging the restraining device, the stability of the device is increased, thus avoiding the regulators of most devices from being adjusted easily. In the process of using the devices, after the regulator is adjusted, the devices will be loose, so that the devices cannot be fastened on the table and other objects, resulting in the loss of the fixed effect of the devices. Therefore, the stability of the devices is improved and the fixed performance of the devices is increased.

In the present invention, by arranging the positioning apparatus, when the auxiliary support for the fixator is provided, the pressing blocks on two sides are pressed. The pressing blocks are loaded by the force, and at the same time the pressure is applied to the pinch plates. The pinch plates are loaded by the force, at the same time, the limiting springs are extruded, and then the limiting springs deform due to the force. At the same time, the pinch plates lose the restraint, are displaced and disengage from the clamping slot, and then the pressing blocks are pushed. The pressing blocks drive the stabilizing block to insert into the anchoring block due to the force. After the stabilizing block is completely inserted into the anchoring block, the pressing blocks are released. At the same time, the limiting springs lose the pressure and drive the pinch plates to reset. The pinch plates are inserted into another clamping slot during the reset, and the stabilizing block is fixed. By arranging the positioning apparatus, the firmness of the fixator is increased, thus preventing the fixator from shaking during use, so that the devices are difficult to ensure the firmness during use. Therefore, the shake of the devices is reduced, and the firmness of the devices is increased.

LEGENDS 1. clip seat; 2. clamping plate; 3. regulator; 4. fixator; 5. positioning clip; 6. restraining apparatus; 61. positioning block; 62. support frame; 63. limiting bolt; 64. reset spring; 65. binding block; 66. inserting post; 67. knob; 7. positioning apparatus; 71. guiding rail; 72. stabilizing block; 73. limiting spring; 74. pinch plate; 75. pressing block; 76. anchoring block.

DETAILED DESCRIPTION

To understand above purposes, features and advantages of the present invention more clearly, the present invention is further described below in combination with drawings and embodiments. It should be explained that if there is no conflict, embodiments in the present application and the features in the embodiments can be mutually combined.

Many specific details are elaborated in the following description to thoroughly understand the present invention. However, the present invention can also be implemented in other modes different from those described herein. Therefore, the present invention is not limited to specific embodiments of the description disclosed below.

Figure 1:
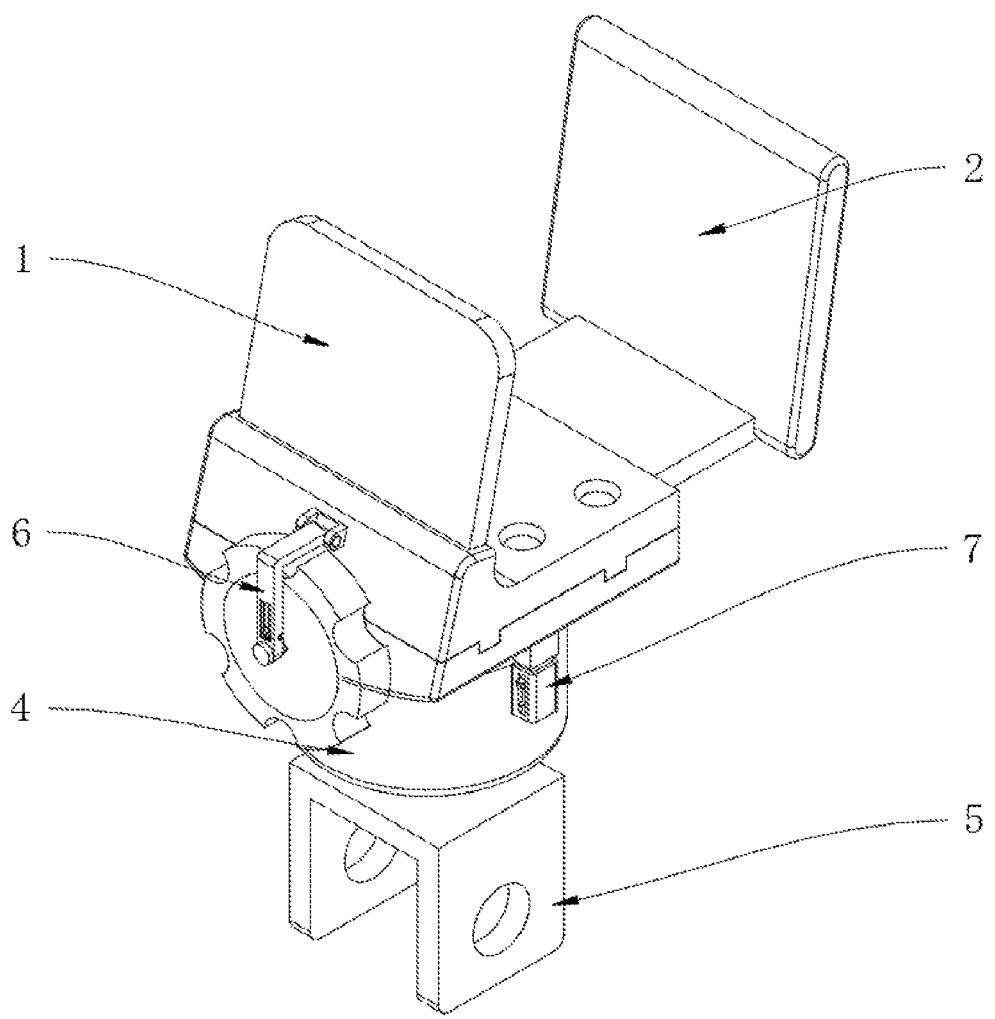
FIG. 1 is a stereographic structural schematic diagram of an adaptability strength clip proposed in the present invention.
Figure 2:
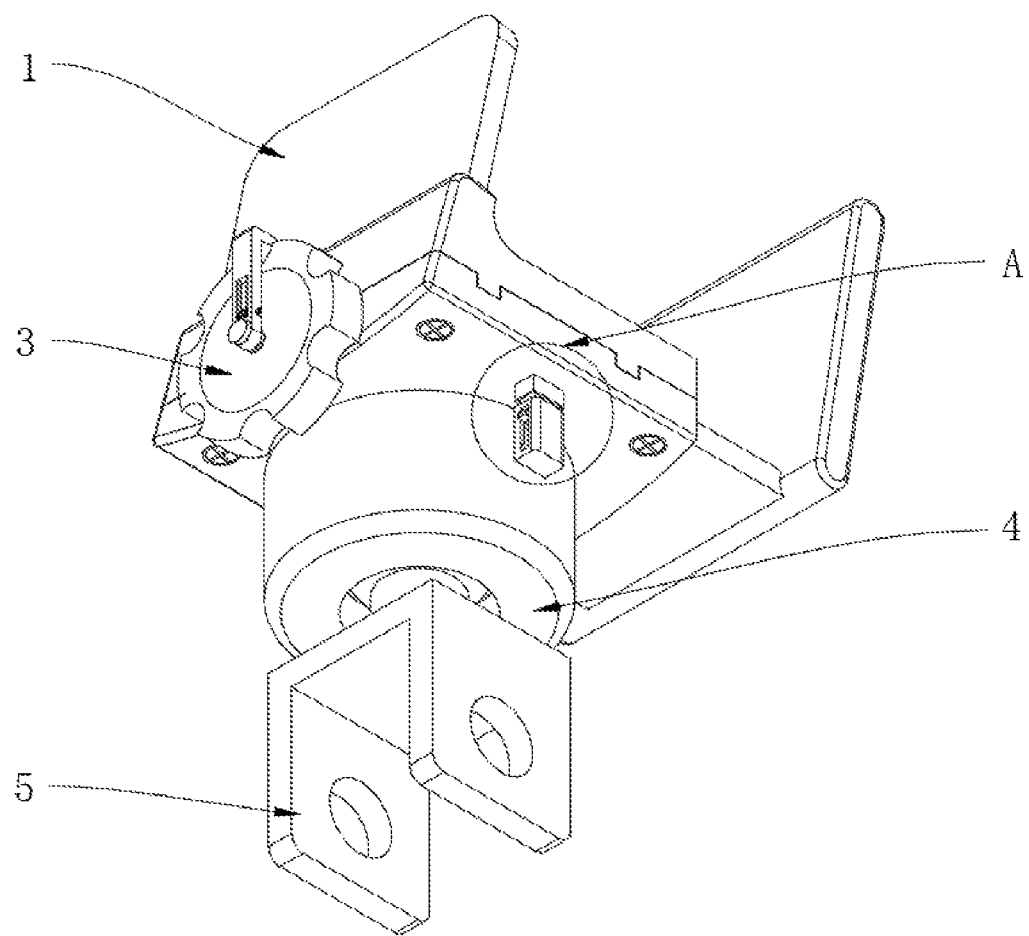
FIG. 2 is a bottom structural schematic diagram of an adaptability strength clip proposed in the present invention.
Figure 3:
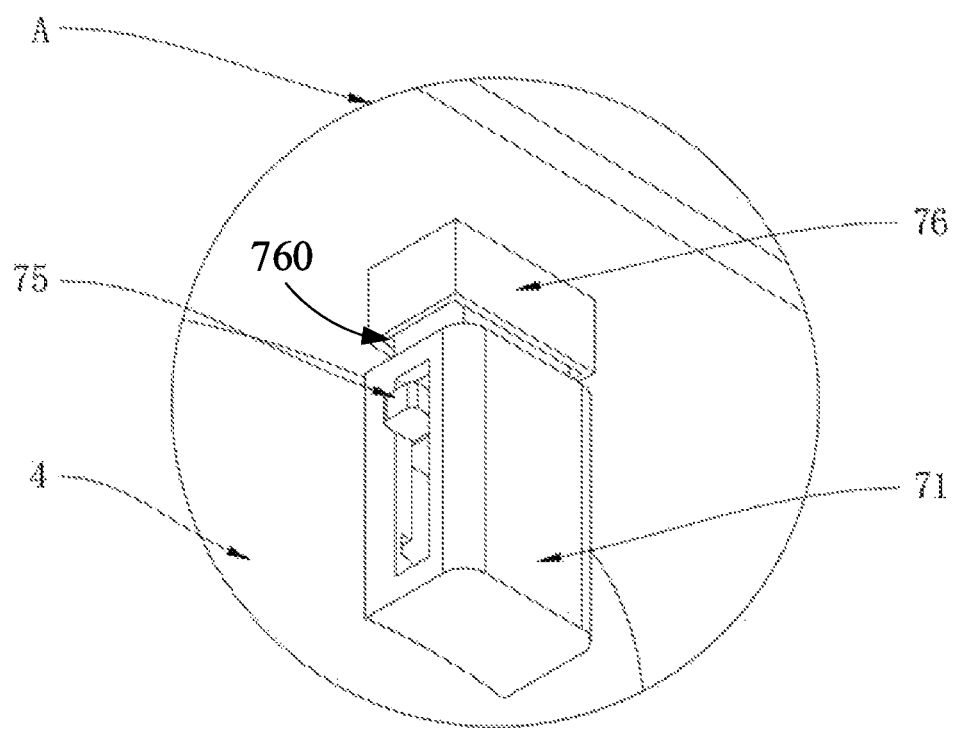
FIG. 3 a structural schematic diagram of a position A in FIG. 2 of an adaptability strength clip proposed in the present invention.
Figure 4:
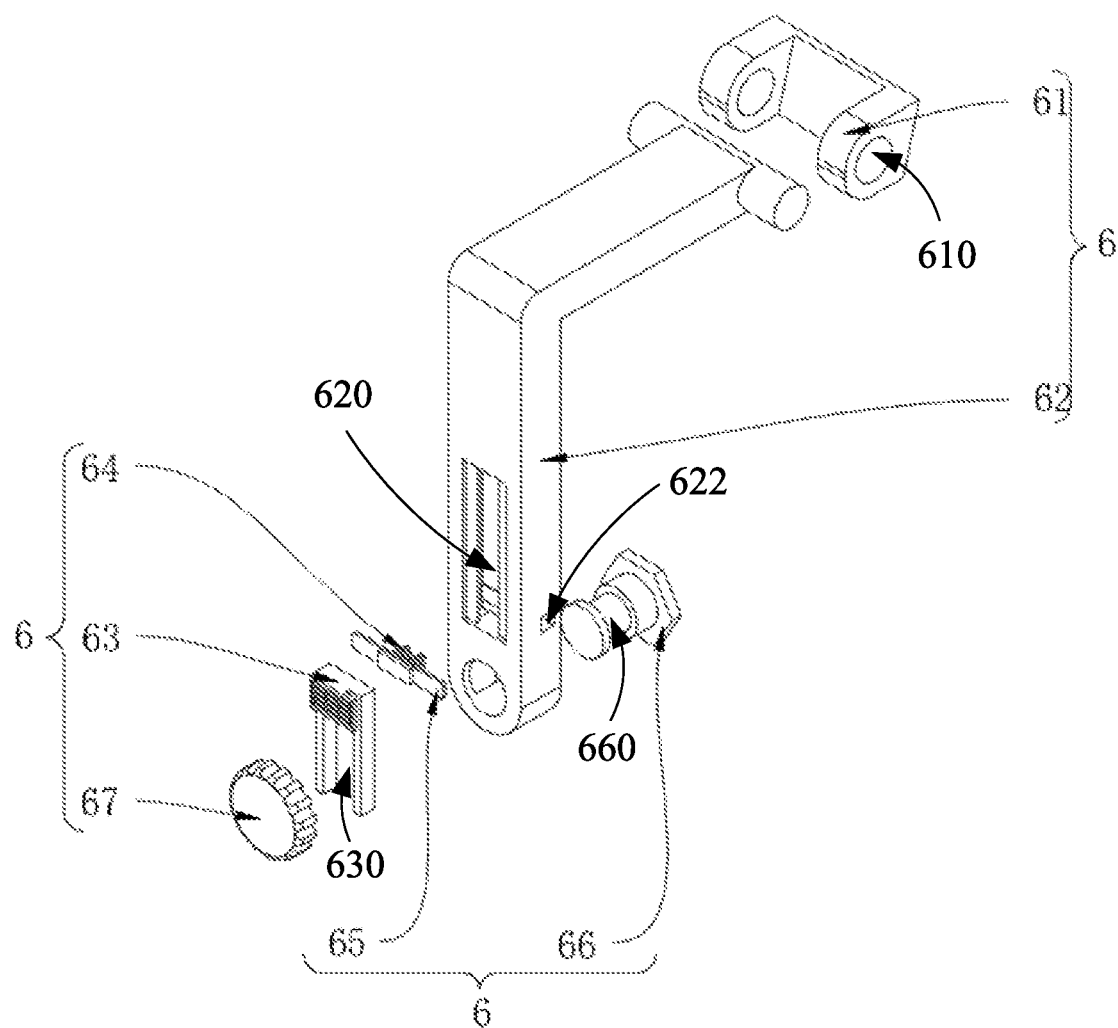
FIG. 4 is a structural schematic diagram of a restraining apparatus for an adaptability strength clip proposed in the present invention.
Figure 5:
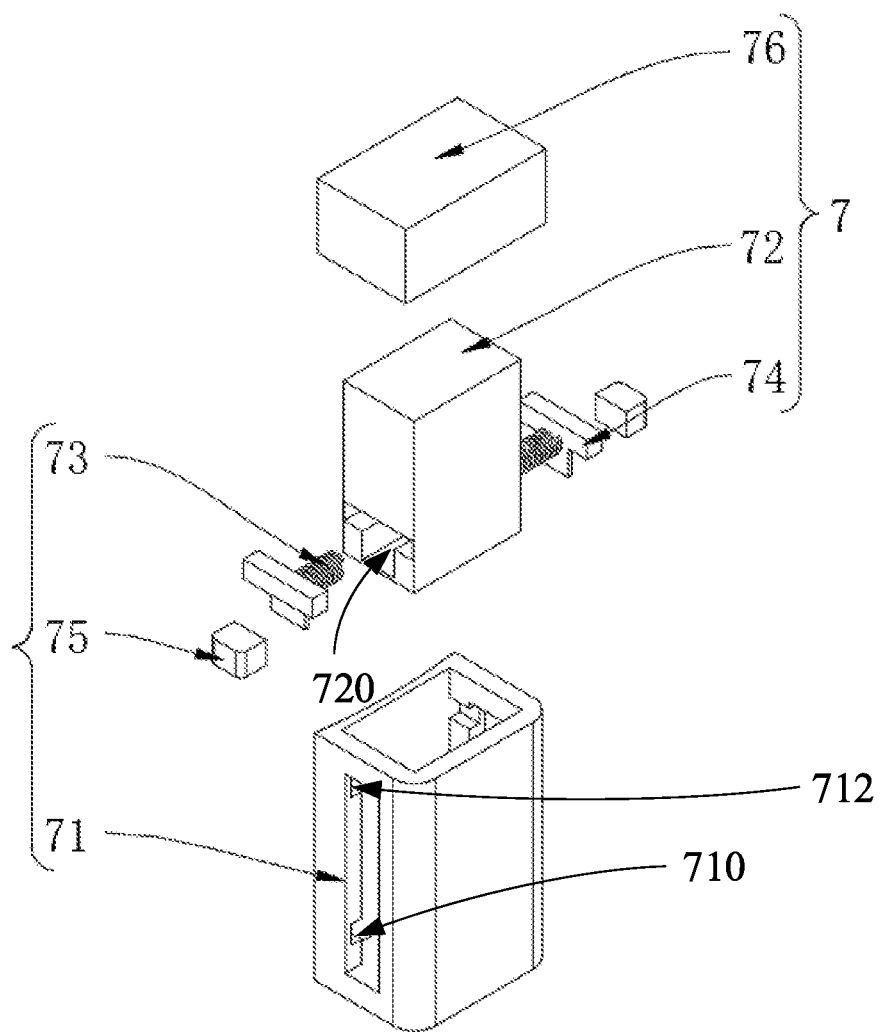
FIG. 5 is a structural schematic diagram of a positioning apparatus for an adaptability strength clip proposed in the present invention.

Referring to FIGS. 1-5, the present invention provides a technical solution: an adaptability strength clip comprises a clip seat 1, a clamping plate 2 and a restraining apparatus 6. The clamping plate 2 is slidably connected with an inner wall of the clip seat 1. A regulator 3 is rotatably connected on a surface of the clip seat 1. A fixator 4 is fixedly connected on the surface of the clip seat 1. The inner wall of the fixator 4 is rotatably connected with a positioning clip 5. The restraining device 6 is arranged on the surface of the clip seat 1. The positioning clip 5 is arranged. The devices can be expanded through the positioning clip 5, so that the functions of the devices can be increased and the use space of the devices is increased.

The specific settings and functions about the restraining device 6 and the positioning device 7 are as follows.

In the implementation solution: the restraining device 6 comprises a positioning block 61. The positioning block 61 is fixedly connected on the surface of the clip seat 1. Two positioning holes 610 are formed in the surface of the positioning block 61. The inner walls of the two positioning holes 610 are rotatably connected with two opposite ends of a support frame 62. A sliding slot 620 is formed in the surface of the support frame 62. The inner wall of the sliding slot 620 is inserted into and slidably connected with a limiting bolt 63.

Specifically, the inner wall of the support frame 62 is fixedly connected with a reset spring 64. One side of the reset spring 64 away from the support frame 62 is fixedly connected with a binding block 65. A round hole is formed in the surface of the support frame 62. The inner wall of the round hole is inserted into and slidably connected with an inserting post 66. A knob 67 is fixedly connected on the surface of the inserting post 66. The support frame 62 is arranged, and a position of the apparatus can be adjusted through the support frame 62, thus preventing the apparatus from interfering with the use of devices.

Specifically, a mounting hole 622 is formed in the surface of the support frame 62. The binding block 65 is slidably connected with the mounting hole 622. A positioning slot 630 is formed in the surface of the limiting bolt 63. The binding block 65 is inserted into and connected with the positioning slot 630.

In the implementation solution: the binding block 65 is arranged, and a position of the limiting bolt 63 can be restrained through the binding block 65, so that the position of the limiting bolt 63 cannot be moved, thus realizing the effect that the inserting post 66 is fixed.

Specifically, a limiting slot 660 is formed in the surface of the inserting post 66. The limiting bolt 63 is inserted into and connected with the limiting slot 660. An inserting slot is formed in the surface of the regulator 3. The inserting post 66 is inserted into and connected with the inserting slot. The inserting post 66 is arranged, and a controller can be fixed by the inserting post 66, so that the stability of the controller is increased.

In the implementation solution: specifically, a positioning device 7 is arranged on the surface of the fixator 4. The positioning device 7 comprises a guiding rail 71. The guiding rail 71 is fixedly connected on a surface of a positioner. The inner wall of the guiding rail 71 is inserted into and slidably connected with a stabilizing block 72. A mounting slot 720 is formed in the surface of the stabilizing block 72. The inner wall of the mounting slot 720 is fixedly connected with a limiting spring 73.

In the implementation solution: a guiding rail 71 is arranged, and moving tracks of the stabilizing block 72 can be guided by the guiding rail 71, so that the stabilizing block 72 can be accurately inserted into an anchoring block 76.

Specifically, the inner wall of the mounting slot is inserted into and slidably connected with a pinch plate 74. A pressing block 75 is fixedly connected on a surface of the pinch plate 74. The anchoring block 76 is fixedly connected on the surface of the clip seat 1. The pinch plate 74 is arranged, and the position of the stabilizing block 72 can be fixed by matching the pinch plate 74 with the limiting spring 73, thereby avoiding movement of the stabilizing block 72 during use.

Specifically, one side of the limiting spring 73 away from the stabilizing block 72 is fixedly connected with the pinch plate 74. A first clamping slot 710 and a second clamping slot 712 are formed in the inner wall of the guiding rail 71. The pinch plate 74 is inserted into and connected with one of the first clamping slot 710 and the second clamping slot 720. The pinch plate 74 is inserted into and connected with the first clamping slot 710 when the stabilizing block 72 is disengaged from the anchoring block 76 and is inserted into and connected with the second clamping slot 712 when the stabilizing block 72 is engaged into the anchoring block 76. A rectangular slot 760 is formed in the surface of the anchoring block 76. The stabilizing block 72 is inserted into and connected with the rectangular slot 760.

In the implementation solution: the limiting spring 73 is arranged. The position of the stabilizing block 72 can be restrained through the limiting spring 73, and at the same time, after the displacement of the stabilizing block 72, the limiting spring 73 can be pushed to reset.

An operating principle: when the devices are used, the devices are clipped onto a table or a handle, and the regulator 3 is rotated immediately. The regulator 3 drives the clamping plate 2 to move as it rotates. The clamping plate 2 is tightened during displacement. Then, the devices are then fixed to a surface of an item. At the same time, the devices can be expanded through the positioning clip 5 to facilitate increasing the functions of the devices. By arranging the restraining device 6, when the devices need to be adjusted, the binding block 65 is pressed. The binding block 65 exerts the pressure on the reset spring 64 due to the force, and then the reset spring 64 is deformed due to the force. At the same time, the binding block 65 loses the restraint, is displaced and disengages from the limiting bolt 63, and then the limiting bolt 63 is pushed. The limiting bolt 63 disengages from the inserting post 66 due to the force, and then the knob 67 is pulled. The knob 67 drives the inserting post 66 to move due to the force. The inserting post 66 disengages from the regulator 3 during the displacement, and then the support frame 62 is rotated. In the process of rotation, the support frame 62 drives the inserting post 66 to rotate, and then the device can be adjusted using the regulator 3. By arranging the restraining device 6, the stability of the device is increased, thus preventing the regulators 3 of most devices from being adjusted easily. In the process of using the devices, after the regulator 3 is adjusted, the devices will be loose, so that the devices cannot be fastened on the table and other objects, resulting in the loss of the fixed effect of the devices, thus improving the stability of the equipment and increasing the fixed performance of the devices. Accordingly, when the auxiliary support for the fixator 4 is provided using the positioning device 7, the pressing blocks 75 on two sides are pressed. The pressing blocks 75 are loaded by the force, and at the same time the pressure is applied to the pinch plates 74. The pinch plates 74 are loaded by the force, at the same time, the limiting springs 73 are extruded, and then the limiting springs 73 deform due to the force. At the same time, the pinch plates 74 lose the restraint, are displaced and disengage from the first clamping slot 710, and then the pressing blocks 75 are pushed. The pressing blocks drive the stabilizing block 72 to insert into the anchoring block 76 due to the force. After the stabilizing block 72 is completely inserted into the anchoring block 76, the pressing blocks are released. At the same time, the limiting springs 73 lose the pressure and drive the pinch plates 74 to reset. The pinch plates 74 are inserted into the second clamping slot 712 during the reset, and the stabilizing block 72 is fixed. By arranging the positioning apparatus 7, the firmness of the fixator 4 is increased, thus avoiding the situation that the fixator 4 is prone to shake during use, so that the devices are difficult to ensure the firmness during use. Therefore, the shake of the devices is reduced, and the firmness of the devices is increased.

The above only describes preferred embodiments of the present invention, not intended to limit the present invention in any form. Any of those skilled in the art may make amendments or modifications to the above disclosed technical content into equivalent embodiments with equivalent changes to apply to other fields. However, any simple amendment, equivalent change and modification made to the above embodiments according to the technical essence of the present invention without departing from the content of the technical solutions of the present invention shall still belong to the protection scope of the technical solutions of the present invention.

What is claimed is:

1. An adaptability strength clip, comprising a clip seat (1), a clamping plate (2) and a restraining apparatus (6), wherein the clamping plate (2) is slidably connected with an inner wall of the clip seat (1); a regulator (3) is rotatably connected on a surface of the clip seat (1); a fixator (4) is fixedly connected on the surface of the clip seat (1); the inner wall of the fixator (4) is rotatably connected with a positioning clip (5); the restraining device (6) is arranged on the surface of the clip seat (1); the restraining device (6) comprises a positioning block (61); the positioning block (61) is fixedly connected on the surface of the clip seat (1); two positioning holes are formed in the surface of the positioning block (61); the inner walls of the two positioning holes are rotatably connected with two opposite ends of a support frame (62) respectively; a sliding slot is formed in the surface of the support frame (62); and the inner wall of the sliding slot is inserted into and slidably connected with a limiting bolt (63).

2. The adaptability strength clip according to claim 1, wherein the inner wall of the support frame (62) is fixedly connected with a reset spring (64); one side of the reset spring (64) away from the support frame (62) is fixedly connected with a binding block (65); a round hole is formed in the surface of the support frame (62); the inner wall of the round hole is inserted into and slidably connected with an inserting post (66); and a knob (67) is fixedly connected on the surface of the inserting post (66).

3. The adaptability strength clip according to claim 2, wherein a mounting hole is formed in the surface of the support frame (62); the binding block (65) is slidably connected with the mounting hole; a positioning slot is formed in the surface of the limiting bolt (63); and the binding block (65) is inserted into and connected with the positioning slot.

4. The adaptability strength clip according to claim 2, wherein a limiting slot is formed in the surface of the inserting post (66); the limiting bolt (63) is inserted into and connected with the limiting slot; an inserting slot is formed in the surface of the regulator (3); and the inserting post (66) is inserted into and connected with the inserting slot.

5. The adaptability strength clip according to claim 1, wherein a positioning apparatus (7) is arranged on the surface of the fixator (4); the positioning apparatus (7) comprises a guiding rail (71); the guiding rail (71) is fixedly connected on the fixator (4); the inner wall of the guiding rail (71) is inserted into and slidably connected with a stabilizing block (72); a mounting slot is formed in the surface of the stabilizing block (72); and the inner wall of the mounting slot is fixedly connected with a limiting spring (73).

6. The adaptability strength clip according to claim 5, wherein the inner wall of the mounting slot is inserted into and slidably connected with a pinch plate (74); a pressing block (75) is fixedly connected on the surface of the pinch plate (74); and an anchoring block (76) is fixedly connected on the surface of the clip seat (1).

7. The adaptability strength clip according to claim 6, wherein one side of the limiting spring (73) away from the stabilizing block (72) is fixedly connected with the pinch plate (74); a first clamping slot (710) and a second clamping slot (712) are formed in the inner wall of the guiding rail (71); the pinch plate (74) is inserted into and connected with the first clamping slot (710) when the stabilizing block (72) is disengaged from the anchoring block (76) and is inserted into and connected with the second clamping slot (712) when the stabilizing block (72) is engaged into the anchoring block (76); a rectangular slot (660) is formed in the surface of the anchoring block (76); and the stabilizing block (72) is inserted into and connected with the rectangular slot (660).

\* \* \* \* \*